(12) United States Patent
Park et al.

(10) Patent No.: US 9,377,972 B2
(45) Date of Patent: Jun. 28, 2016

(54) HOST DEVICE, MANAGEMENT SERVER, AND METHOD OF SOLVING ERROR OF IMAGE FORMING APPARTUS

(75) Inventors: In-chang Park, Seoul (KR); Hyung-jong Kang, Seoul (KR); Jeong-hun Kim, Seoul (KR); Gi-won Seo, Seoul (KR); Mi-sook Song, Suwon-si (KR); Hee-chul Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/551,281

(22) Filed: Jul. 17, 2012

(65) Prior Publication Data

US 2013/0021641 A1    Jan. 24, 2013

(30) Foreign Application Priority Data

Jul. 19, 2011    (KR) .................. 10-2011-0071590

(51) Int. Cl.
| | | |
|---|---|---|
| *G06K 15/00* | (2006.01) | |
| *G06F 3/12* | (2006.01) | |
| *G03G 15/00* | (2006.01) | |
| *G06F 11/07* | (2006.01) | |
| *H04N 1/00* | (2006.01) | |

(52) U.S. Cl.
CPC ............ *G06F 3/121* (2013.01); *G03G 15/5079* (2013.01); *G06F 3/1229* (2013.01); *G06F 3/1288* (2013.01); *G06F 11/0733* (2013.01); *G06F 11/0748* (2013.01); *G06F 11/0793* (2013.01); *H04N 1/00079* (2013.01); *H04N 1/00204* (2013.01); *H04N 1/00344* (2013.01); *H04N 2201/0082* (2013.01); *H04N 2201/0091* (2013.01); *H04N 2201/0093* (2013.01); *H04N 2201/0094* (2013.01)

(58) Field of Classification Search
CPC ... G03G 15/55; G03G 15/5075; G03G 3/121; G03G 3/1235; G03G 3/1288; G03G 11/3065; G03G 11/3013; G03G 11/3055; H04N 1/00408; H04N 1/00413; H04N 1/00472; H04N 1/32635; H04N 1/32657; H04N 1/00482
USPC ........ 358/1.1, 1.9, 1.13, 1.14, 1.15, 404, 437; 709/220; 399/8, 9, 11; 382/112
See application file for complete search history.

(56) References Cited

U.S. PATENT DOCUMENTS

| | | |
|---|---|---|
| 5,734,804 A | 3/1998 | Bergner |
| 2003/0020942 A1 * | 1/2003 | Teres ........................... 358/1.14 |
| 2004/0205087 A1 | 10/2004 | Dorsey et al. |

(Continued)

FOREIGN PATENT DOCUMENTS

| | | |
|---|---|---|
| JP | 2006-027022 A | 2/2006 |
| JP | 2009-169504 A | 7/2009 |

OTHER PUBLICATIONS

European Search Report dated Aug. 14, 2013 issued in EP Application No. 12162693.1.

*Primary Examiner* — Gabriel Garcia
(74) *Attorney, Agent, or Firm* — Staas & Halsey LP

(57) ABSTRACT

A host device includes a communication interface unit to receive status information from an image forming apparatus, an error processing unit to control the communication interface unit to transmit error information including the status information to the management server if it is determined that the image forming apparatus has an error according to the received status information, and a user interface unit to display a video manual if a URL address providing a video manual to solve an error of the image forming apparatus is received from the management server.

25 Claims, 19 Drawing Sheets

(56) References Cited

U.S. PATENT DOCUMENTS

| | | |
|---|---|---|
| 2005/0198223 A1 | 9/2005 | Fujinawa et al. |
| 2005/0286073 A1* | 12/2005 | Christopher .................. 358/1.15 |
| 2006/0256367 A1* | 11/2006 | Wei ............................... 358/1.15 |
| 2009/0316174 A1 | 12/2009 | Kurahashi |

* cited by examiner

<DupPathJam0 STRING="Paper jam at the top of duplex path." GeneralMSG="Jam0Duplex">
<Status>[04][03][01][0C][FF][FF][FF][FF]</Status>
</DupPathJam0>

FIG. 6

Status Code : | Type | Stat | Stat | Stat | Black | Cyan | Mar. | Yell. |

Status Code (Stat Stat Stat), Toner Level (Black Cyan Mar. Yell.)

FIG. 7

```
<TroubleshootingRequest>
    <ModelName isRequestKey="TRUE">Samsung ML-371x Series</ModelName>
    <StatusElememt>PaperJam0Tray1</StatusElement>
    <GeneralStatusElement>JamTray1</GeneralStatusElement>
    <Language>EN</Language>
    <FWversion>1.00.00</FWversion>
    <SerialNumber>ABF54132423</SerialNumber>
    <Resolution X="1024" Y="768"/>
</TroubleshootingRequest>
```

FIG. 8

```
<TroubleshootingResponse Result="SUCCESS">
    <Response Type="URL" Element="PaperJam0Tray1" GeneralElement="JamTray1">
http://sec.com/test.jsp?id=423213
    </Response>
    <Response Type="URL" Element="PaperJam1" GeneralElement="JamInside">
http://sec.com/test.jsp?id=423214
    </Response>
    <Response Type="URL" Element="PaperJam2" GeneralElement="JamExitArea">
http://sec.com/test.jsp?id=423215
    </Response>
    <Response Type="URL" Element="PaperJam0MPF" GeneralElement="JamMP">
http://sec.com/test.jsp?id=423216
    </Response>
    <Response Type="URL" Element="DupPathJam0" GeneralElement="Jam0Duplex">
http://sec.com/test.jsp?id=423217
    </Response>
    <Response Type="URL" Element="DupPathJam1" GeneralElement="Jam1Duplex">
http://sec.com/test.jsp?id=423218
    </Response>
    <Response Type="URL" Element="DupPathJam2" GeneralElement="Jam2Duplex">
http://sec.com/test.jsp?id=423219
    </Response>
</TroubleshootingResponse>
```

FIG. 9

```
<Response Type="URL" Element="DupPathJam2" GeneralElement="Jam2Duplex">
    http://sec.com/test.jsp?id=423219
</Response>
```

FIG. 10

```
<TroubleshootingResponse Result="SUCCESS" Version="1.01.00">
    <Response Type="URL" Element="PaperJam0Tray1" GeneralElement="JamTray1" Version="1.00">
http://sec.com/test.jsp?id=423213
    </Response>
    <Response Type="URL" Element="PaperJam1" GeneralElement="JamInside" Version="1.00">
http://sec.com/test.jsp?id=423214
    </Response>
    <Response Type="URL" Element="PaperJam2" GeneralElement="JamExitArea" Version="2.00">
http://sec.com/test.jsp?id=423215
    </Response>
    <Response Type="URL" Element="PaperJam0MPF" GeneralElement="JamMP" Version="1.01">
http://sec.com/test.jsp?id=423216
    </Response>
    <Response Type="URL" Element="DupPathJam0" GeneralElement="Jam0Duplex" Version="1.01">
http://sec.com/test.jsp?id=423217
    </Response>
    <Response Type="URL" Element="DupPathJam1" GeneralElement="Jam1Duplex" Version="1.01">
http://sec.com/test.jsp?id=423218
    </Response>
    <Response Type="URL" Element="DupPathJam2" GeneralElement="Jam2Duplex" Version="1.20">
http://sec.com/test.jsp?id=423219
    </Response>
</TroubleshootingResponse>
```

FIG. 11

| No Resource | <TroubleshootingResponse Result="ERROR" Message="No Resource"></TroubleshootingResponse> |
|---|---|
| Service is not available | <TroubleshootingResponse Result="ERROR" Message="Service is not available"></TroubleshootingResponse> |

FIG. 18

| Items | Details | Remarks |
|---|---|---|
| Product Type | ○Mono LBP ○Mono MFP ○Color LBP ○Color MFP | |
| Model Name | [          ] | INPUT TEXT |
| Language | [Select a language ▼] [modify] | ADD LANGUAGE VALUE BY CLICKING MODIFY/SETTING VALUE FOR CANCELATION:All, Korean(Default), English |
| Error Type #1 | [Select the error type ▼] [modify] | ADD ERROR TYPE VALUE BY CLICKING MODIFY/BASIC VALUE FOR CANCELATION:Jam 0, Jam 1, Jam 2 |
| Error Code | [          ] | INPUT TEXT |
| Flash file | [          ] [upload] [Delete] | |
| Error Type #2 | [Select the error type ▼] [modify] | ADD ERROR TYPE VALUE BY CLICKING MODIFY/SETTING VALUE FOR CANCELATION:Jam 0, Jam 1, Jam 2 |
| Error Code | [          ] | |
| URL | [          ] [upload] [Delete] | |
| Error Type #3 | [Select the error type ▼] [modify] [Add type] | THE NUMBER OF ERROR TYPE MAY INCREASE WHEN ADD TYPE IS CLICKED SETTING NEEDS TO BE CHECKED TO PREVENT DOUBLE-SETTING FOR EACH JAM TYPE |
| Error Code | [          ] | ERROR CODE NEEDS TO BE CHECKED TO PREVENT ERROR CODE OVERLAP WHEN SAVING |
| URL | [          ] [upload] [Delete] | |
| Service Open | ○ Open   ○ Close   ○ Test | -Open : DISCLOSE END USER<br>-Close : NOT DISCLOSE<br>-Test : OPERATE ONLY IN PC IP INPUTTED |

FIG. 19

| MESSAGE ID | OUTPUT MESSAGE (KOREAN) |
|---|---|
| NODOCERR | AUTOMATIC DOCUMENT SUPPLY APPARATUS IS EMPTY. PLEASE PUT IMAGE OR DOCUMENT TO BE SCANNED INTO SUPPLY APPARATUS |
| JAMERR | PAPER IS JAMMED IN AUTOMATIC DOCUMENT SUPPLY APPARATUS. PLEASE REMOVE JAMMED PAPER FROM SUPPLY APPARATUS |
| COVEROPENERR | SCANNER COVER IS OPEN. PLEASE CLOSE COVER |
| LOCKEDERR | SCANNER IS LOCKED. PLEASE RELEASE LOCK AND TRY AGAIN |
| BUSYERR | SCANNER IS IN USE. PLEASE WAIT AND TRY AGAIN. IF THIS MESSAGE IS DISPLAYED AGAIN, RESTART PROGRAM OR TURN OFF AND ON POWER AND WAIT UNTIL SCANNER IS READY. |

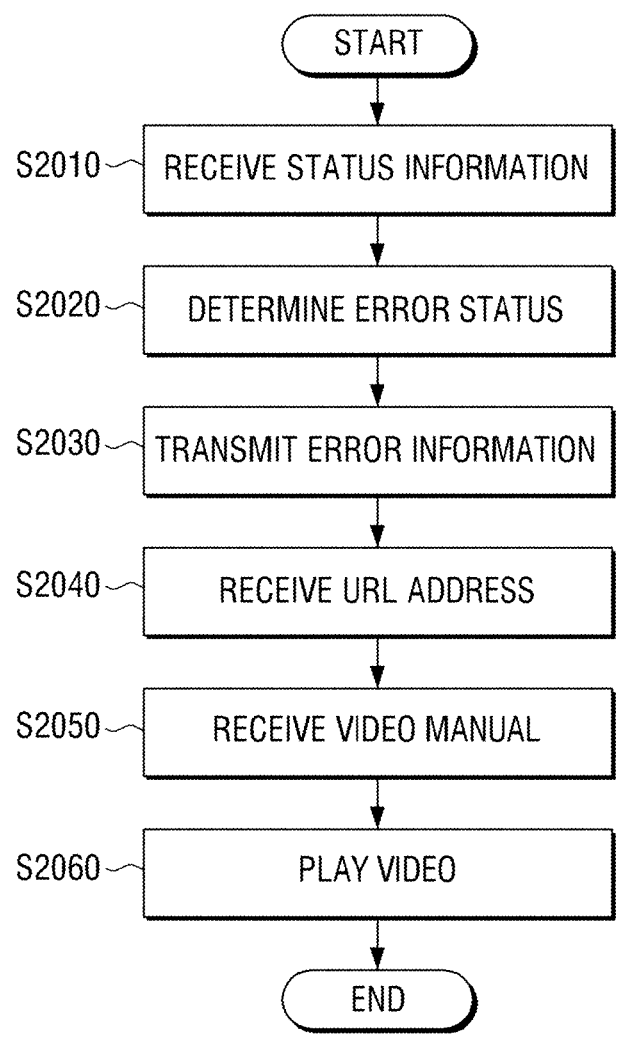

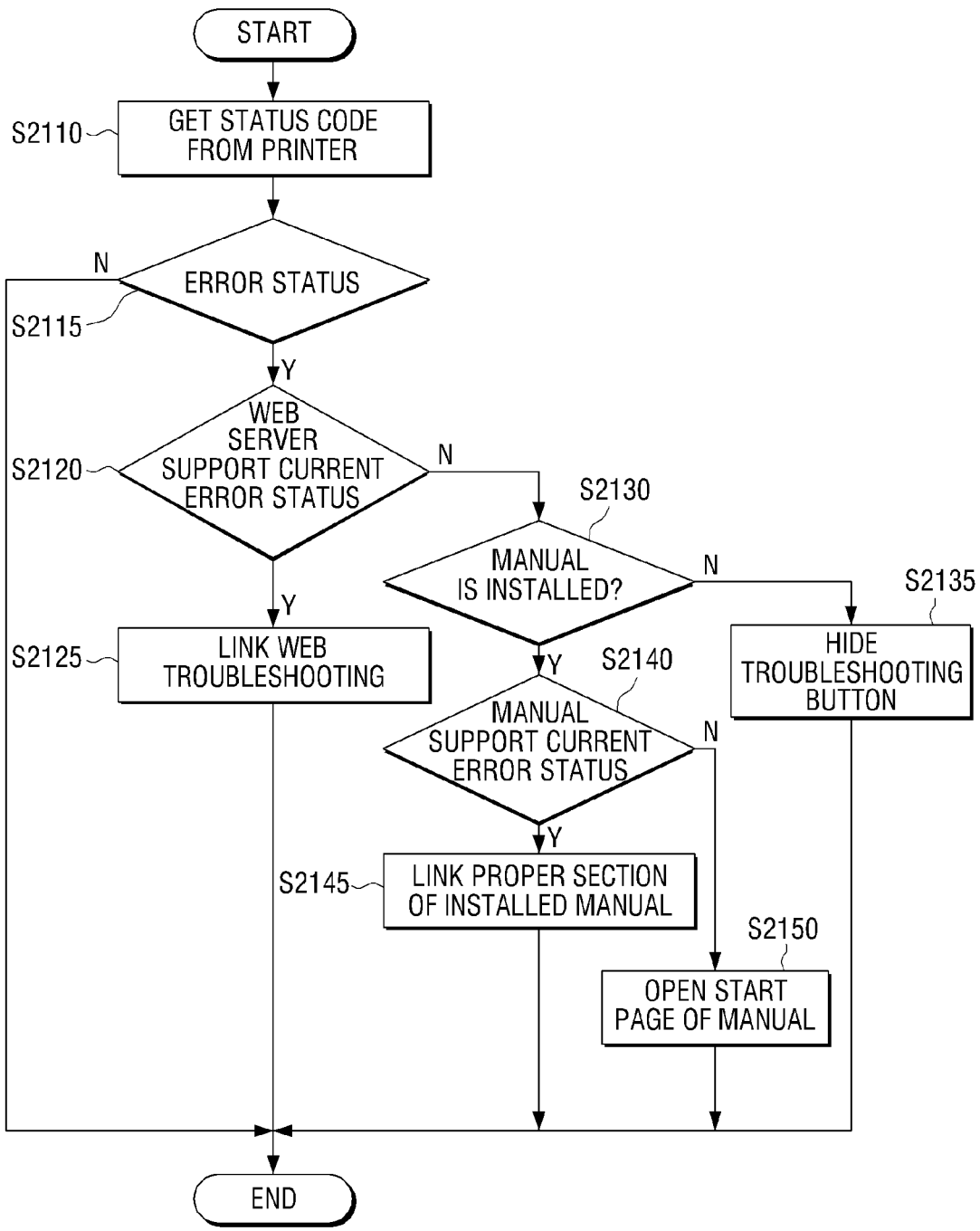

HOST DEVICE, MANAGEMENT SERVER, AND METHOD OF SOLVING ERROR OF IMAGE FORMING APPARTUS

CROSS-REFERENCE TO RELATED APPLICATIONS

This application claims priority under 35 U.S.C. §119 from Korean Patent Application No. 10-2011-0071590, filed in the Korean Intellectual Property Office on Jul. 19, 2011, the contents of which are incorporated herein by reference in its entirety.

BACKGROUND

1. Field

The present general inventive concept relates to a host device, a management server, a method of solving an error of an image forming apparatus, and more particularly, to a host device capable of providing a user with a video manual to solve an error if the error occurs in an image forming apparatus, a management server and a method of solving an error of an image forming apparatus thereof.

2. Description of the Related Art

A conventional image forming apparatus includes an apparatus that prints print data generated from a terminal device such as a computer on a recoding paper. Examples of an image forming apparatus include a copy machine, printer, a fax machine, and a Multi-Function Peripheral (MFP), which can perform the above functions in a single device.

Such an image forming apparatus has mechanical characteristics, and if some mechanical or operational errors occur, a user may be required to address the errors manually.

Therefore, a paper manual or an electronic manual corresponding to the image forming apparatus has been provided to users to help them solve various problems experienced while operating an image forming apparatus. However, such a paper manual or an electronic manual addresses only static connection problems or provides only a static problem-solving method. In addition, such a manual cannot modify previous problem-solving methods or add new problem-solving methods.

SUMMARY

A present general inventive concept provides a host device to provide a video manual to a user to help the user solve a problem when an error occurs in an image forming apparatus, a management server, and a method of solving an error of an image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a host device connectable to at least one image forming apparatus and a management server, including a communication interface unit to receive status information from the image forming apparatus, an error processing unit to control the communication interface unit to transmit error information including the status information to the management server if it is determined that the image forming apparatus has an error according to the received status information, and a user interface unit to display a video manual if a URL address providing a video manual to solve an error of the image forming apparatus is received from the management server.

The user interface unit may display that the image forming apparatus has an error if the image forming apparatus has an error.

The user interface unit may display a user interface window including a first area that shows the error of the image forming apparatus is solvable if the image forming apparatus has an error and a URL address corresponding to the error information is received from the management server.

The user interface unit may display the video manual on a separate user interface window if a user selects the first area.

The user interface unit may display a subtitle corresponding to the video manual on the video manual.

The host device may further include a storage unit to store an electronic document manual to solve an error of an image forming apparatus, and the error processing unit may control the user interface unit to search an area of the electronic document manual corresponding to the error information and display an area of the searched electronic document manual if the image forming apparatus has an error and a URL address corresponding to the error information is not received from the management server.

The status information may include at least one of a status element, a status message, and a status code.

The error information may include at least one of a model name of the image forming apparatus, a status element of the image forming apparatus, firmware information of the image forming apparatus, a language supported by the host device, and resolution information of the image forming apparatus.

The host device may further include a storage unit to store a video manual provided by the URL address.

The foregoing and/or other features and utilities of the present general inventive concept may also be achieved by providing a management server connectable to at least one host device, including a storage unit to store URL address information providing a video manual to solve an error of an image forming apparatus, a communication interface unit to receive error information of an image forming apparatus connected to the host device from the host device, a search unit to search a URL address corresponding to the received error information using the URL address information, and a control unit to store the communication interface unit to transmit the searched URL address to the host device.

The storage unit may store the received error information, and the management server may further include a statistics unit to calculate a statistic value of the stored error information and a user interface unit to display the calculated statistic value.

The storage unit may store a video manual corresponding to each image forming apparatus and each error type, and the communication interface unit may provide the host device with a video manual corresponding to the URL address.

The control unit may change resolution of the video manual according to resolution of the host device and provide the host device with the changed resolution of the video manual.

The foregoing and/or other features and utilities of the present general inventive concept may be achieved by providing a method of solving an error of an image forming apparatus in a host device connected to at least one image forming apparatus and a management server, including receiving status information from the image forming apparatus, determining whether the image forming apparatus has an error according to the received status information, if the image forming apparatus has an error, transmitting error information including the status information to the management server, receiving a URL address providing a video manual to solve an error of the image forming apparatus to the management server, and receiving and displaying the video manual.

The method may further include, if the image forming apparatus has an error, displaying that the image forming apparatus has an error.

The method may further include, if the image forming apparatus has an error and a URL address corresponding to the error information is received from the management server, displaying a user interface window including a first area that shows the error of the image forming apparatus is solvable.

The displaying may include, if a user selects the first area, displaying the video manual on a separate user interface window.

The displaying may include displaying a subtitle corresponding to the video manual on the video manual.

The method may further include, if the image forming apparatus has an error and a URL address corresponding to the error information is not received from the management server, searching pre-stored an electronic document manual to solve an error of an image forming apparatus and displaying an area of the electronic document manual corresponding to the error information.

The status information may include at least one of a status element, a status message, and a status code.

The error information may include at least one of a model name of the image forming apparatus, a status element of the image forming apparatus, firmware information of the image forming apparatus, a language supported by the host device, and resolution information of the image forming apparatus.

The method may further include storing a video manual provided by the URL address.

The foregoing and/or other features and utilities of the present general inventive concept may also be achieved by providing a method of solving an error of an image forming apparatus in a management server connectable to at least one host device, according to an exemplary embodiment, includes receiving error information of an image forming apparatus connected to the host device from the host device, searching a URL address corresponding to the received error information using pre-stored URL address information providing a video manual to solve an error of an image forming apparatus, and transmitting the searched URL address to the host device.

The method may further include storing the received error information, calculating a statistic value of the stored error information, and displaying the calculated statistic value.

The management server may have a plurality of URL addresses providing the video, and the method of solving an error of an image forming apparatus may further include, if a host device is connected to the URL address, providing a video manual corresponding to the URL address to the host device.

The providing may include changing resolution of the video manual according to resolution of the host device and providing the changed resolution of the video manual to the host device.

The foregoing and/or other features and utilities of the present general inventive concept may also be achieved by providing a non-transitory computer readable medium including a program to execute a method of solving an error of an image forming apparatus, wherein the method includes receiving status information from the image forming apparatus, determining whether the image forming apparatus has an error according to the received status information, if the image forming apparatus has an error, transmitting error information including the status information to the management server, receiving a URL address corresponding to the error information from the management server, and receiving and displaying a video manual to solve an error of the image forming apparatus on the URL address.

The foregoing and/or other features and utilities of the present general inventive concept may also be achieved by providing an image forming apparatus including a printing unit to perform a printing operation, an interface unit to transmit error information of an error of the printing unit and to receive a video manual corresponding to the error information, and a display unit to display an image corresponding to the received video manual.

The interface unit may transmit the transmit error information to an external management server such that the external management server searches and transmits a URL address of the video manual corresponding to the error information to the interface unit to allow the display unit to display the video manual.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a view illustrating an example of status information according to an exemplary embodiment of the present general inventive concept;

FIG. 6 is a view illustrating a structure of the status code in FIG. 5;

FIG. 7 is a view illustrating an example of error information according to an exemplary embodiment of the present general inventive concept;

FIGS. 8 through 11 are views illustrating various examples of a Uniform Resource Locator (URL) address information according to an exemplary embodiment of the present general inventive concept;

FIGS. 17 and 18 are views illustrating various examples of a user interface window which can be displayed in the management server in FIG. 1;

FIG. 19 is a view illustrating an example of an error which may occur in relation to a scanning function;

FIG. 20 is a flowchart illustrating a method of solving an error of an image forming apparatus in a host device according to an exemplary embodiment of the present general inventive concept;

FIG. 21 is a flowchart illustrating the operation in FIG. 20; and

DETAILED DESCRIPTION OF THE PREFERRED EMBODIMENTS

Figure 1:
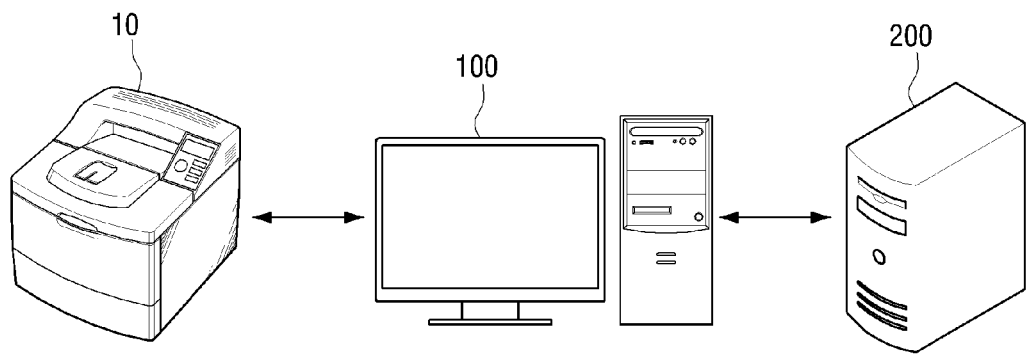
FIG. 1 is a block diagram illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming system according to an exemplary embodiment of the present general inventive concept.

Referring to FIG. 1, the image forming system 1000 includes an image forming apparatus 10, a host device 100, and a management server 200.

The image forming apparatus 10 is connected to the host device 100 and may transmit its own information to the host device 100 upon a request from the host device 100. Herein, the image forming apparatus 10 may include a copy machine, printer, a fax machine, and Multi-Function Peripheral (MFP), which performs the above functions in a single device, but is not limited thereto.

The host device 100 is connected to at least one of the image forming apparatus 10 and the management server 200 and may receive status information from the connected image forming apparatus 10 and determine whether the image forming apparatus 10 has an error based on the received status information.

If it is determined that the connected image forming apparatus 10 has an error, the host device 100 may transmit error information including the received status information to the management server 200 and receive a Uniform Resource Locator (URL) address to provide a user with a video manual to solve the error from the management server 200. In addition, the host device 100 may receive and display a video manual to solve an error using the received URL address. The specific configuration and operation of the host device 100 will be explained with reference to FIG. 2. Meanwhile, the host device 100 may be a computer apparatus, a PC, a notebook computer, a PMP, an MP3 player, a navigator, and a mobile phone, but is not limited thereto.

The management server 200 is connected to at least one host device 100 and may receive error information from the connected host device 100 and provide a URL address corresponding to the error information to the host device 100. The specific configuration and operation of the management server 200 will be explained with reference to FIG. 3.

In the above description regarding FIG. 1, one image forming apparatus 10 is directly connected to the host device 100. However, a plurality of image forming apparatuses may be connected to the host device 100 either directly or indirectly via a device such as a router through a wired or wireless communication. In addition, the one host device 100 is directly connected to the management server 200 in FIG. 1. However, a plurality of host devices may be connected to the management server 200 either directly or indirectly via a device such as a router through a wired or wireless communication.

In the above description regarding FIG. 1, the host device 100 determines an error status of the image forming apparatus 10 and provides (e.g., displays) a video manual accordingly. However, if the image forming apparatus 10 has a display unit to play a video, the image forming apparatus 10 may transmit error information to the management server 200 directly, receive a corresponding URL address, and display a video manual corresponding to its own error directly. It is also possible that the image forming apparatus 10 may transmit the error information to the management server 200 through the host device 100, receive the video manual from the host device 100, and control the display unit to play a video, that is, the video manual.

The image forming apparatus 10 may include a printing unit to perform a printing operation, an interface unit to transmit error information of an error of the printing unit and to receive a video manual, and a display unit to display an image corresponding to the received video manual. The printing unit and the interface unit and other components of the image forming apparatus 10 may be associated with the printing operation. The error information may correspond to an error based on an operation of the printing unit, a malfunctioning component in the image forming apparatus 10, or any other error associated with the image forming apparatus 10 and components coupled thereto to perform the printing operation. The display unit of the image forming apparatus 10 may be disposed within a housing of the image forming apparatus 10. The interface unit may include any type of device that allows for communication between the image forming apparatus 10 and other external devices, such as the host 100 or the management server 200. Furthermore, the printing unit, the interface unit, and the display unit of the image forming apparatus 10 may all be controlled by a controller to perform the printing operation and the communication operation.

Figure 2:
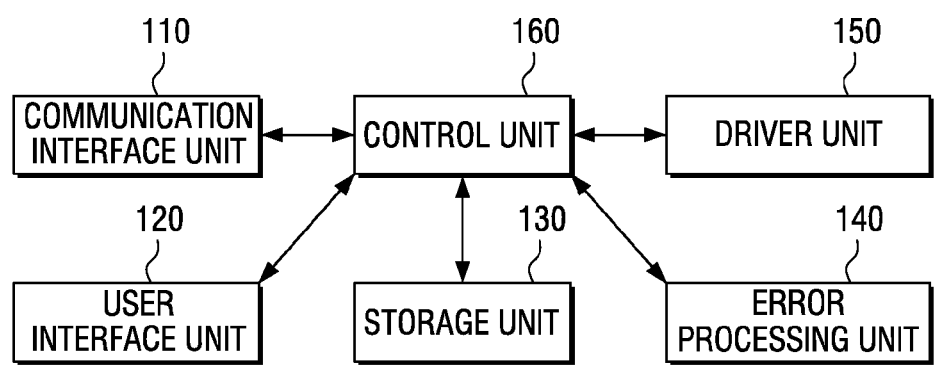
FIG. 2 is a block diagram illustrating a configuration of the host device in FIG. 1.

FIG. 2 is a block diagram illustrating a configuration of the host device in FIG. 1.

Referring to FIG. 2, the host device 100 includes a communication interface unit 110, a user interface unit 120, a storage unit 130, an error processing unit 140, a driver unit 150, and a control unit 160.

The communication interface unit 110 is connected wired or wirelessly to at least one image forming apparatus 10 and the management server 200 via a Local Area Network (LAN), an Internet network, or through a Universal Serial Bus (USB).

The communication interface unit 110 receives status information from the image forming apparatus 10. The communication interface unit 110 may request status information periodically or upon a user's request and receive status information from the image forming apparatus 10 in accordance with the request. In this case, the status information may be received via a USB end point 0 (EPO) or a hyper-text transfer protocol (HTTP). Herein, the status information indicates status of the image forming apparatus 10 and may be an Extensible Mark-up Language (XML) file including a status element, a status message and a status code.

Meanwhile, referring to FIG. 2, the host device 100 requests and receives status information from the image forming apparatus 10. However, status information may be received without a request from the host device 100. If the image forming apparatus 10 transmits its own status information to the host device 100 periodically or when an error occurs, status information of the corresponding image forming apparatus 10 may be received without a request.

The communication interface unit 110 transmits error information to the management server 200. The communication interface unit 110 may transmit error information generated from an error processing unit 140, which will be explained later, to the management server 200. The error information may include a model name of the image forming apparatus 10, the status information of the image forming apparatus 10, firmware information of the image forming apparatus 10, a language supported by the host device 100, and resolution information of the image forming apparatus 10, but is not limited thereto.

The communication interface unit 110 receives a URL address from the management server 200. The communication interface unit 110 may receive information including a URL address corresponding to error information from the management server 200 in response to the transmission of error information. Herein, the URL address is an Internet file address to provide a video manual to solve a problem corresponding to a specific model or a specific error of an image forming apparatus.

The communication interface unit 110 receives the video manual. The communication interface unit 110 may access the received URL address and receive the video manual. In this case, the received video manual may be stored in the storage unit 130. Herein, the video manual is a video or a flash image providing a method of installing the image forming apparatus 10 or a method to solve an error corresponding to the image forming apparatus 10. The video manual may include a subtitle on one portion of the video.

The user interface unit 120 may include a plurality of function keys through which a user may set or select various functions supported by the host device 100, and may display various information provided by the host device 100. The user interface unit 120 may be realized as an apparatus such as a touch pad where input and output are performed at the same time, or may be realized by combining an input apparatus such as a mouse and a keyboard with a display apparatus such as a CRT monitor, a LCD monitor, and an LED, but is not limited thereto.

The user interface unit 120 may receive a print command from a user. In addition, the user interface unit 120 may display status information of a connected image forming apparatus 10. The user interface unit 120 may display a user interface window to manage a connected image forming apparatus 10. If a connected image forming apparatus 10 has an error, the user interface unit 120 may display a user interface window to inform the user that the image forming apparatus 10 has an error. In addition, the user interface unit 120 may receive a manual display command to solve an error of the image forming apparatus 10. The user interface unit 120 may display a received video manual or a pre-stored electronic document manual via the communication interface unit 110. An example of a specific user interface window will be explained with reference to FIGS. 12 through 16.

The storage unit 130 stores an electronic document manual. Herein, the electronic document manual may include an electronic document including text and graphics provided by a manufacturer in order to provide a user with a method of installing the image forming apparatus 10 and a method of solving an error of the image forming apparatus 10.

The storage unit 130 stores status information. The storage unit 130 may store status information received from the image forming apparatus 10 via the communication interface unit 110. In addition, the storage unit 130 may temporarily store error information generated by the error processing unit 140, which will be explained later.

The storage unit 130 stores a URL address. The storage unit 130 may store a URL address received from the management server 200 via the communication interface unit 110.

The storage unit 130 also stores a video manual. The storage unit 130 may store a video manual received from a URL address via the communication interface unit 110.

Meanwhile, the storage unit 130 may be an internal storage medium within the host device 100 or an external storage medium such as a removable disk or semiconductor memory including a USB memory, a storage medium connected to the host device 100, and a web server using a network, but is not limited thereto.

The error processing unit 140 determines whether an image forming apparatus has experienced an error based on received status information. The error processing unit 140 may determine whether a connected image forming apparatus 10 has an error or is in a warning status using a status code included in status information received via the communication interface unit 110. However, a processing method during a time when the image forming apparatus 10 has a warning status is the same as a processing method when the image forming apparatus 10 experiences an error.

If the image forming apparatus 10 experiences an error, the error processing unit 140 transmits error information to the management server 200. If the connected image forming apparatus 10 experiences an error, the error processing unit 140 may control the communication interface unit 110 to transmit error information including a model type and error type of the image forming apparatus 10 to the management server 200 to receive an address of a video content corresponding to the error of the image forming apparatus 10.

If a URL address corresponding to the error is received from the management server 200, the error processing unit 140 may control the communication interface unit 110 and the user interface unit 120 to receive and display a video content related to a corresponding URL address. Meanwhile, if the transmission speed of a video content of the communication interface unit 110 is good, the error processing unit 140 may control the user interface unit 120 to display a received video content in real-time, however, if the transmission speed of a video content of the communication interface unit 110 is poor, the error processing unit 140 may control the user interface unit 120 to display a received video content after it is downloaded completely.

If a URL address corresponding to an error is not received from the management server 200, the error processing unit 140 may control the user interface unit 120 to search a corresponding error in an electronic document manual stored in the storage unit 130 and display the searched area of the electronic document manual.

The driver unit 150 generates print data of a file regarding which print command is input. The driver unit 150 may control the communication interface unit 110 to transmit the converted print data to the image forming apparatus 10.

If the image forming apparatus 10 supports a scanning function, the driver unit 150 may transmit a scanning command to the image forming apparatus 10, and receive and process a scanned image from the image forming apparatus 10 in accordance with the scanning command input from a user.

The control unit 160 may control each component included in the host device 100. The control unit 160 may control the communication interface unit 110 to receive status information of the connected image forming apparatus 10, and if it is determined that the connected image forming apparatus 10 has an error, the control unit 160 may control the error processing unit 140 to display a video manual corresponding to the error.

As described above, the host device 100 according to an exemplary embodiment provides a user with a video manual corresponding to the errors of the image forming apparatus 10 and thus, the user may solve the errors of the image forming apparatus 10 easily. In addition, as a video manual is received from outside (e.g., an external source such as the Internet) and provided to a user, a method of installing a printer and a method of solving an error may be provided even in a mobile device (e.g., a mobile phone) in which an electronic document manual is not installed.

Figure 3:
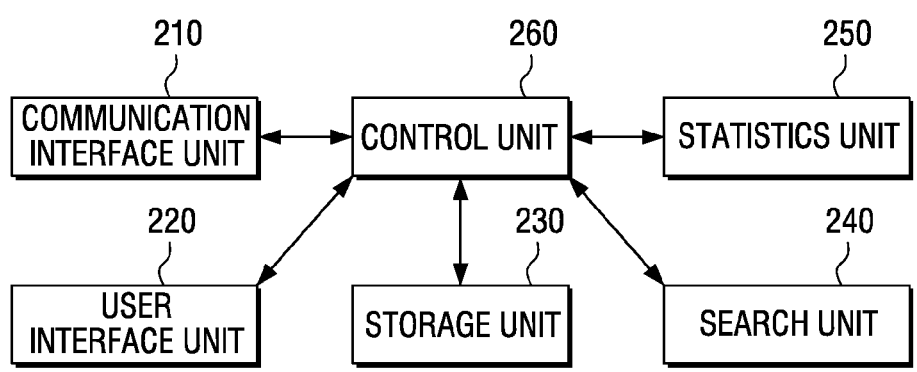
FIG. 3 is a block diagram illustrating a configuration of the management server in FIG. 1.

FIG. 3 is a block diagram illustrating configuration of the management server in FIG. 1.

Referring to FIG. 3, the management server 200 includes a communication interface unit 210, a user interface unit 220, a storage unit 230, a search unit 240, a statistics unit 250, and a control unit 260.

The communication interface unit 210 is formed to connect to at least one host device 100, and may be connected with wire or wirelessly via a Local Area Network (LAN) or an Internet network or through a Universal Serial Bus (USB).

The communication interface unit 210 receives error information. The error information may include the model name of the image forming apparatus 10, the status information of the image forming apparatus 10, the firmware information of the image forming apparatus 10, the language supported by the host device 100, and the resolution information of the image forming apparatus 10, but is not limited thereto.

The communication interface unit 210 transmits a URL address. The communication interface unit 210 may transmit a URL address searched by the search unit 240 which will be explained later to the corresponding host device 100 in response to the reception of error information. Herein, the URL address is an Internet file address to provide a video manual to solve a problem of a specific model or a specific error of an image forming apparatus 10. The URL address may be an address of the management server 200 or an address of a server which stores a video manual separately, but it not limited thereto.

The communication interface unit 210 transmits a video manual. If the management server 200 stores a video manual, the communication interface unit 210 may transmit a video manual corresponding to a URL address accessed by the host device 100 to the corresponding host device 100. Meanwhile, if resolution information is included in error information received from a host device 100, the communication interface unit 210 may change resolution of a video manual according to the resolution of the host device 100 and transmit the changed video manual to the host device 100.

The user interface unit 220 may include a plurality of function keys through which a user may set or select various functions supported by the management server 200, and may display various information provided by the management server 200. The user interface unit 220 may be realized as an apparatus such as a touch pad where input and output are performed at the same time, or may be realized by combining an input apparatus such as a mouse and a keyboard with a display apparatus such as a CRT monitor, a LCD monitor, and a LED, but is not limited thereto.

The user interface unit 220 displays a calculated statistic value. The user interface unit 220 may display a user interface window including a statistic value calculated by the statistics unit 250, which will be explained later.

The user interface unit 220 may receive a command to change URL address information. If it is necessary to change a method of solving a previous error or to add a new method of solving an error, a manager may add a new video manual or renew a previous video. In this case, the manager may update a previous video manual or add a new video manual using a user interface window provided by the user interface unit 220 and change URL address information accordingly. The specific configuration of a user interface window will be explained with reference to FIGS. 17 and 18.

The storage unit 230 stores error information. The storage unit 230 may store error information received through the communication interface unit 210. The stored error information is used when a statistic value is calculated by the statistics unit 250, which will be explained later, and the storage unit 230 may store the calculated statistic value.

The storage unit 230 stores URL address information. The storage unit 230 may store the type of image forming apparatuses 10, video manuals corresponding to each error, and URL addresses of video manuals in the form of a look-up table.

In addition, the storage unit 230 may store a plurality of video manuals. If the management server 200 provides a video manual directly to the host device 100, the storage unit 230 may store the type of image forming apparatuses 10 and video manuals corresponding to each error.

Meanwhile, the storage unit 230 may include a storage medium in the management server 200 or an external storage medium such as a removable disk including a USB memory and a storage medium connected to a server separately, but is not limited thereto.

The search unit 240 searches a URL address corresponding to received error information. The search unit 240 may search a URL address providing a video manual corresponding to received error information using URL address information stored in the storage unit 230.

The statistics unit 250 calculates a statistic value of error information. The statistics unit 250 may calculate a statistic value of the number of errors corresponding to each image forming apparatus 10 and the number of errors corresponding to each error type.

The control unit 260 may control each component included in the management server 200. If error information is received from the host device 100, the control unit 260 may control the search unit 240 to search a URL address corresponding to the error information and control the communication interface unit 210 to transmit the searched URL address to the corresponding host device 100. In addition, the control unit 260 may control the storage unit 230 to store the received error information and control the statistics unit 250 to process the received error information statistically.

As described above, as the management server 200 according to an exemplary embodiment provides a video manual corresponding to an error of the image forming apparatus 10 to the host device 100, a user may solve the error of the image forming apparatus 10 easily. In addition, in the case where a method of solving an error of the image forming apparatus 10 needs to be changed, or a new method of solving an error needs to be added, a manager may change or add error solving methods easily.

Figure 4:
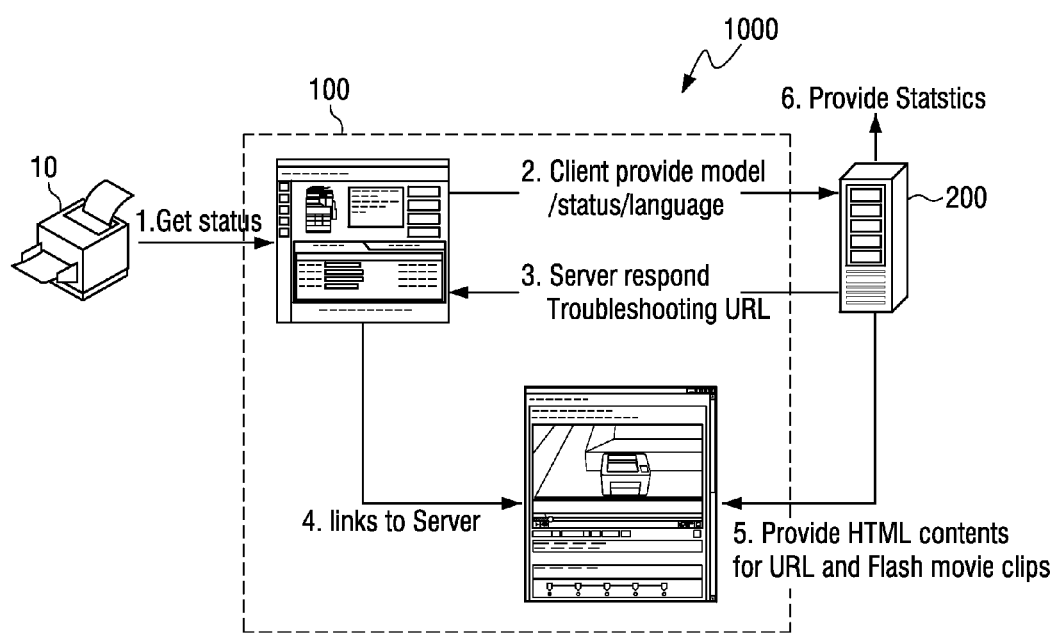
FIG. 4 is a view illustrating an operation of an image forming system according to an exemplary embodiment of the present general inventive concept.

FIG. 4 is a view illustrating an operation of an image forming system 1000 according to an exemplary embodiment of the present general inventive concept.

Referring to FIG. 4, the host device 100 receives status information from the image forming apparatus 10 (1). The host device 100 determines whether the image forming apparatus 10 has an error based on the received status information, and if it is determined that the image forming apparatus 10 has an error, the host device 100 transmits error information including the type of error and the model information of the image forming apparatus 10 to the management server 200 (2).

Subsequently, the management server 200 which receives error information searches a URL address corresponding to a video manual corresponding to the error information. The management server 200 transmits the searched URL address to the host device 100.

Subsequently, the host device 100 which receives the URL address may access a URL address provided by the management server 200 (4) and receive and display a video manual on the corresponding URL address (5).

In the above description with regard to FIG. 4, the management server 200 provides a video manual directly, but a video manual may be provided by another server or a host device which is different from the management server 200.

As described above, the image forming system 1000 of FIG. 4 provides a user with a video manual corresponding to an error of the image forming apparatus 10 and thus, the user may solve an error corresponding to the image forming apparatus 10 easily. In addition, as a video manual is received from outside and provided to a user, a method of installing a printer and a method of solving an error may be provided even in a mobile device (e.g., a mobile phone) in which an electronic document manual is not installed. Further, in the case where a method of solving an error of the image forming apparatus 10 needs to be changed, or a new method of solving an error needs to be added, a manager may change or add error solving methods easily.

FIG. 5 is a view illustrating an example of status information according to an exemplary embodiment of the present general inventive concept.

Referring to FIG. 5, status information according to an exemplary embodiment includes a status element, a status message and a status code, and is written in an XML language.

The status element is an element corresponding to a status of an image forming apparatus 10. For example, the status element in FIG. 5 is "DupPathJamo".

The status message is a message to explain the status element. For example, the status message in FIG. 5 is "Paper jam at the top of duplex path."

The status code is an 8-byte code representing a status of an image forming apparatus 10 and a toner level. For example, the status code in FIG. 5 is "0403010CFFFFFFFF." The specific structure of a status code will be explained with reference to FIG. 6.

FIG. 6 is a view illustrating a structure of the status code in FIG. 5.

Referring to FIG. 6, a status code includes type, state, and toner level.

The type is a 2-byte code representing a status of an image forming apparatus 10 and may have a value of error, warning, or information.

The state is a 6-byte code representing a status code of each status.

The toner level is a code representing the percentage of a toner level with regard to black (K), magenta (M), cyan (C), and yellow (Y).

FIG. 7 is a view illustrating an example of error information according to an exemplary embodiment of the present general inventive concept.

Referring to FIG. 7, error information includes model name, status element, general status element, language, firmware information, serial number, and resolution information.

The model name area is an area to display a model name of an image forming apparatus 10 having an error.

The status element area is an area to display a status element in status information received from the image forming apparatus 10.

The general status element area is an area to display status information which is in a higher rank than a status element.

The language area is an area to display a language provided to a user of the host device 100.

The firmware area is an area to display firmware information of the image forming apparatus 10.

The serial number area is an area to display a serial number of the image forming apparatus 10.

The resolution area is an area to display screen resolution supported by the host device 100.

In the exemplary embodiment, error information includes model name, status element, general status element, language, firmware information, serial number, and resolution information, but information included in the error information may be changed.

FIGS. 8 through 11 are views illustrating examples of a URL address transmitted to the host device 100 from the management server 200.

The management server 200 may provide all of the URL addresses of video manuals corresponding to the model of an image forming apparatus 10 having an error to the host device 100. Alternatively, the management server 200 may provide a URL address of a video manual corresponding to an error of an image forming apparatus 10 along with a URL address of a video manual which is closely related to an error of an image forming apparatus 10 to the host device 100. In this case, the management server 200 may transmit a URL address group as illustrated in FIG. 8. Herein, the host device 100 may connect to a URL address which is closely related to the error of an image forming apparatus 10 first from among a plurality of URL addresses received.

In addition, the management server 200 may provide only a URL address corresponding to an error to the host device 100. In this case, the management server 200 may provide only one URL address as illustrated in FIG. 9.

Meanwhile, if the same error occurs repeatedly, the host device 100 may pre-store a video manual. In this case, the host device 100 does not have to receive the same manually repeatedly. However, if a video manual is updated as an error solving method is changed, the management server may display version information of the video manual when the URL address is transmitted to the host device 100 so that a new video manual instead of the pre-stored video manual can be displayed in the host device 100. The management server 200 may transmit a URL address to the host device 100 as illustrated in FIG. 10.

Meanwhile, if there is an error in the management server 200 or too many users are being connected, the management server 200 may transmit an XML including error information as illustrated in FIG. 11. In this case, the host device 100 may search pre-stored electronic document manuals and display an area of an electronic document manual corresponding to the error.

FIGS. 12 through 16 are views illustrating various examples of a user interface window which can be displayed in the host device 100 in FIG. 1.

Figure 12:
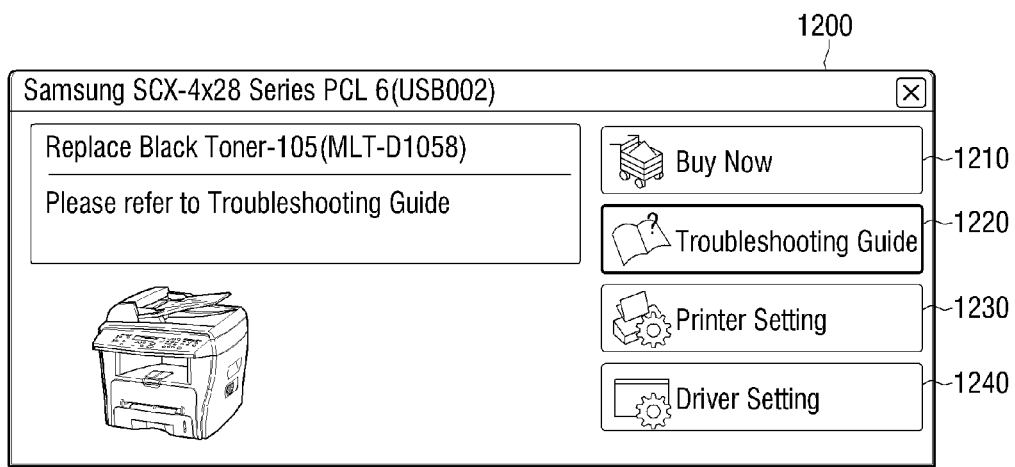
FIGS. 12 through 16 are views illustrating various examples of a user interface window which can be displayed in the host device in FIG. 1.

Referring to FIG. 12, the user interface window 1200 displays a status of a connected image forming apparatus 10. The user interface window 1200 includes a website connection area 1210 to purchase expendables, an area 1220 to select a user command to perform an operation to solve an error of an image forming apparatus 10, an area 1230 to receive a user command to change a setting of an image forming apparatus 10, and an area 1240 to receive a user command to change a setting of a printer driver. If there is an error in the connected image forming apparatus 10, a user may select the area 1220 to be provided with a video manual.

Figure 13:
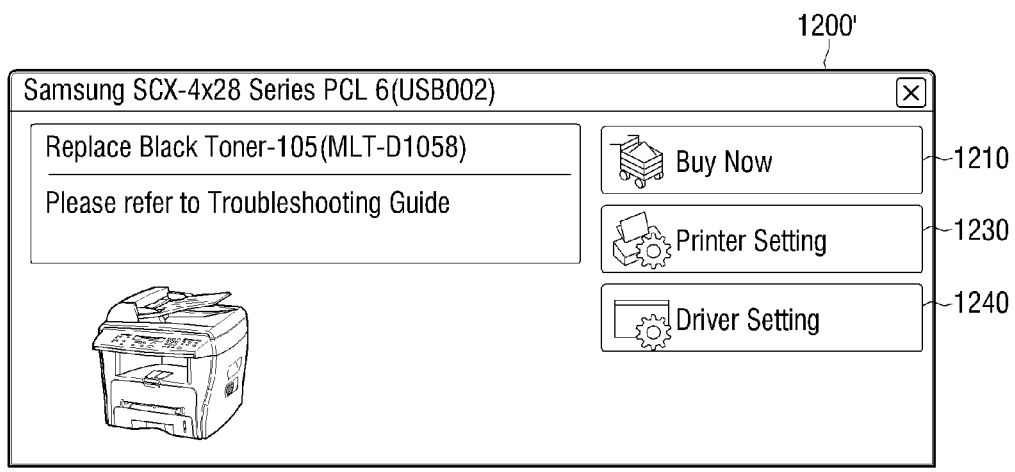

Meanwhile, if a connected image forming apparatus has no error or if it is difficult to provide a user with a video manual or an electronic document manual corresponding to an error, the area 1220 to select a user command to perform an operation to solve an error of an image forming apparatus may not be displayed as illustrated in a user interface window 1200' of FIG. 13.

Figure 14:
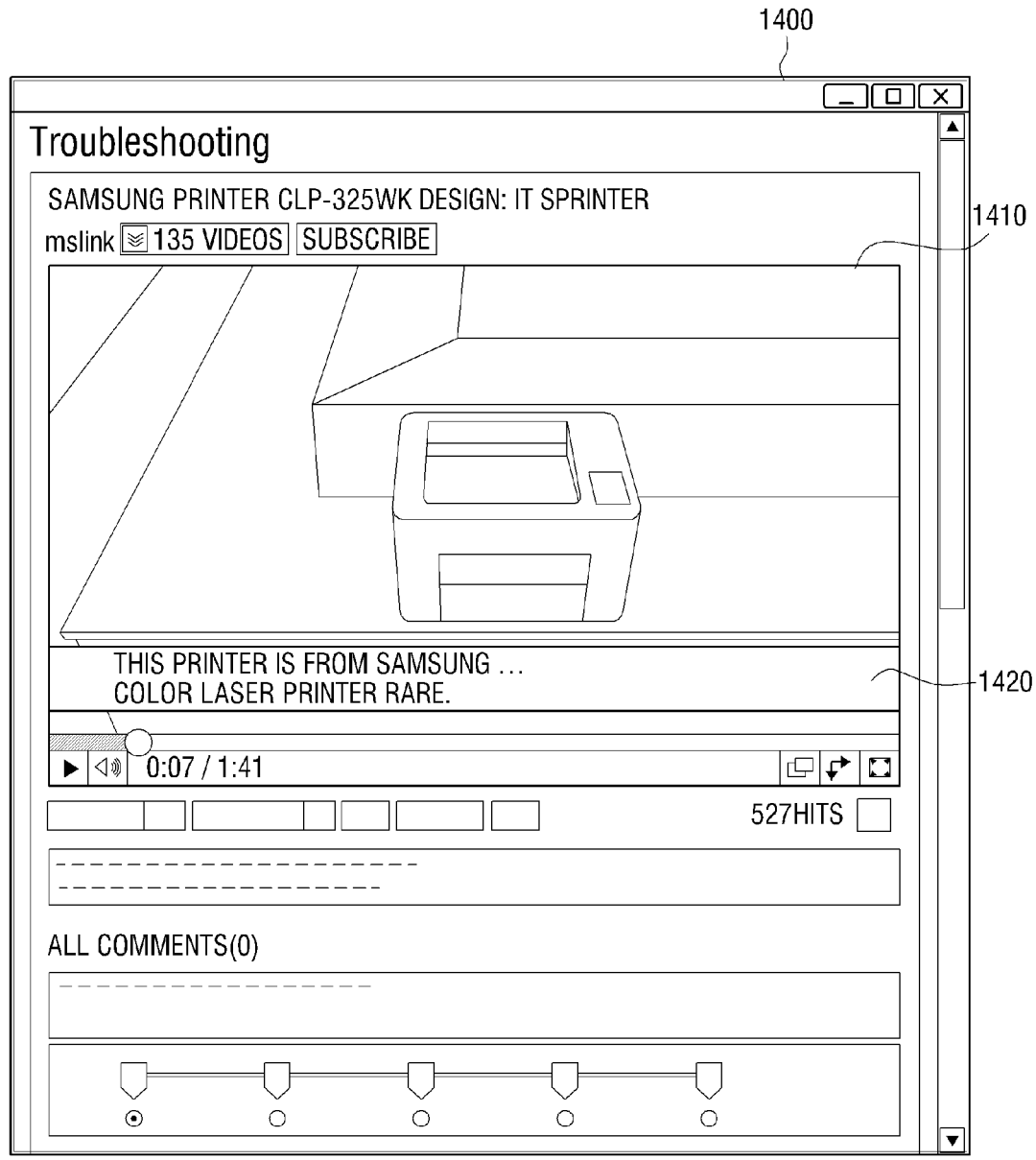

Referring to FIG. 14, a user interface window 1400 includes a first area 1410 to display a video manual. In this case, the user interface window 1400 may also display a subtitle corresponding to the audio of the video manual in one portion 1420 of the first area 1410.

Figure 15:
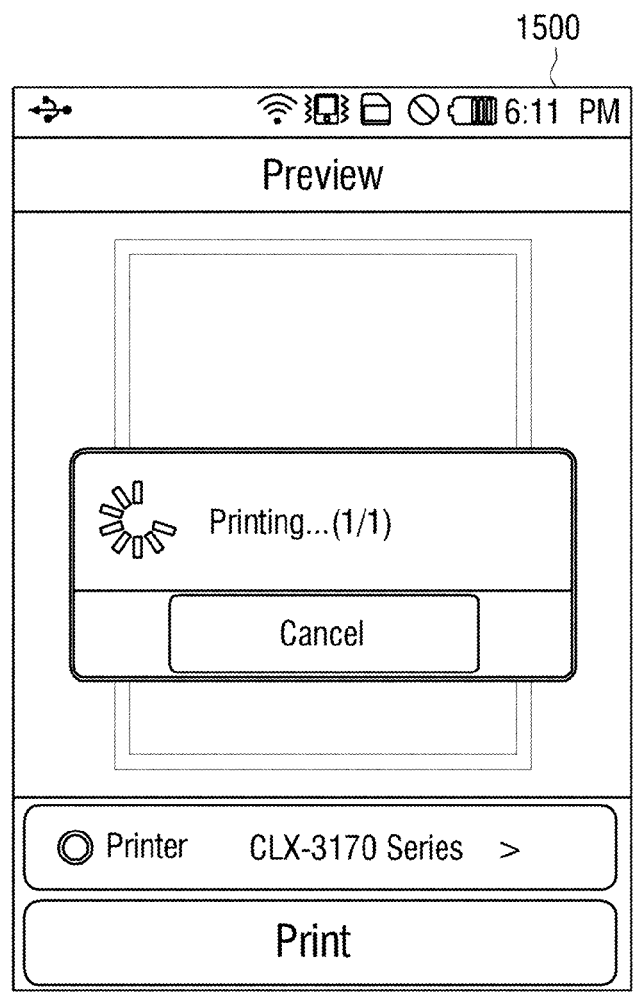

Referring to FIG. 15, a host device according to an exemplary embodiment of the present general inventive concept may be a mobile device 1500, such as a mobile phone. Recently, the mobile device 1500 may perform a printing operation by connecting to an image forming apparatus 10, as illustrated in FIG. 15.

Figure 16:
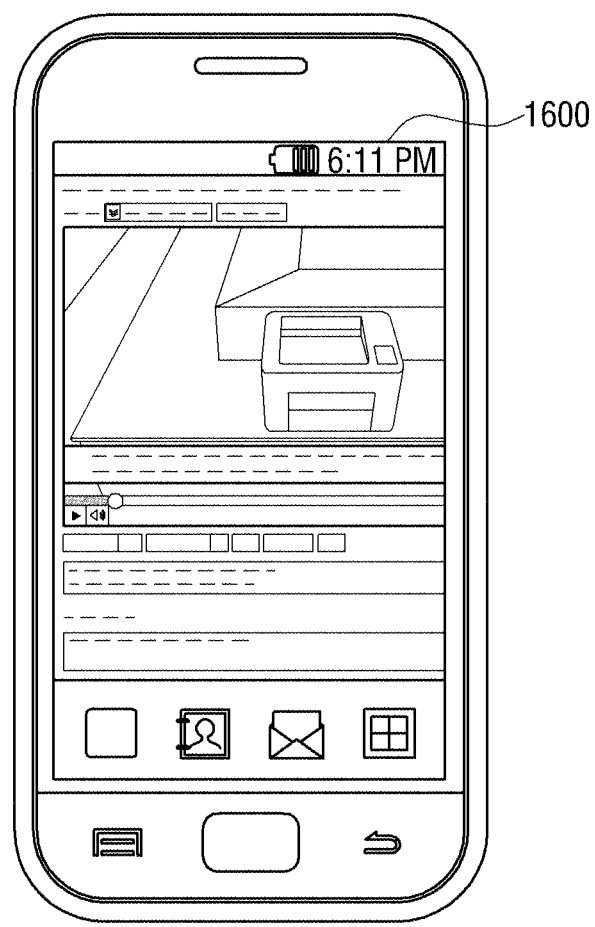

In particular, in a mobile device 1500, an electronic document manual which takes up considerable amount of capacity cannot be provided. However, the host device 100 according to an exemplary embodiment may access a video manual stored in an external apparatus, such as a server 200, and thus, may provide a manual easily even in a mobile device 1600, as illustrated in FIG. 16.

Figure 17:
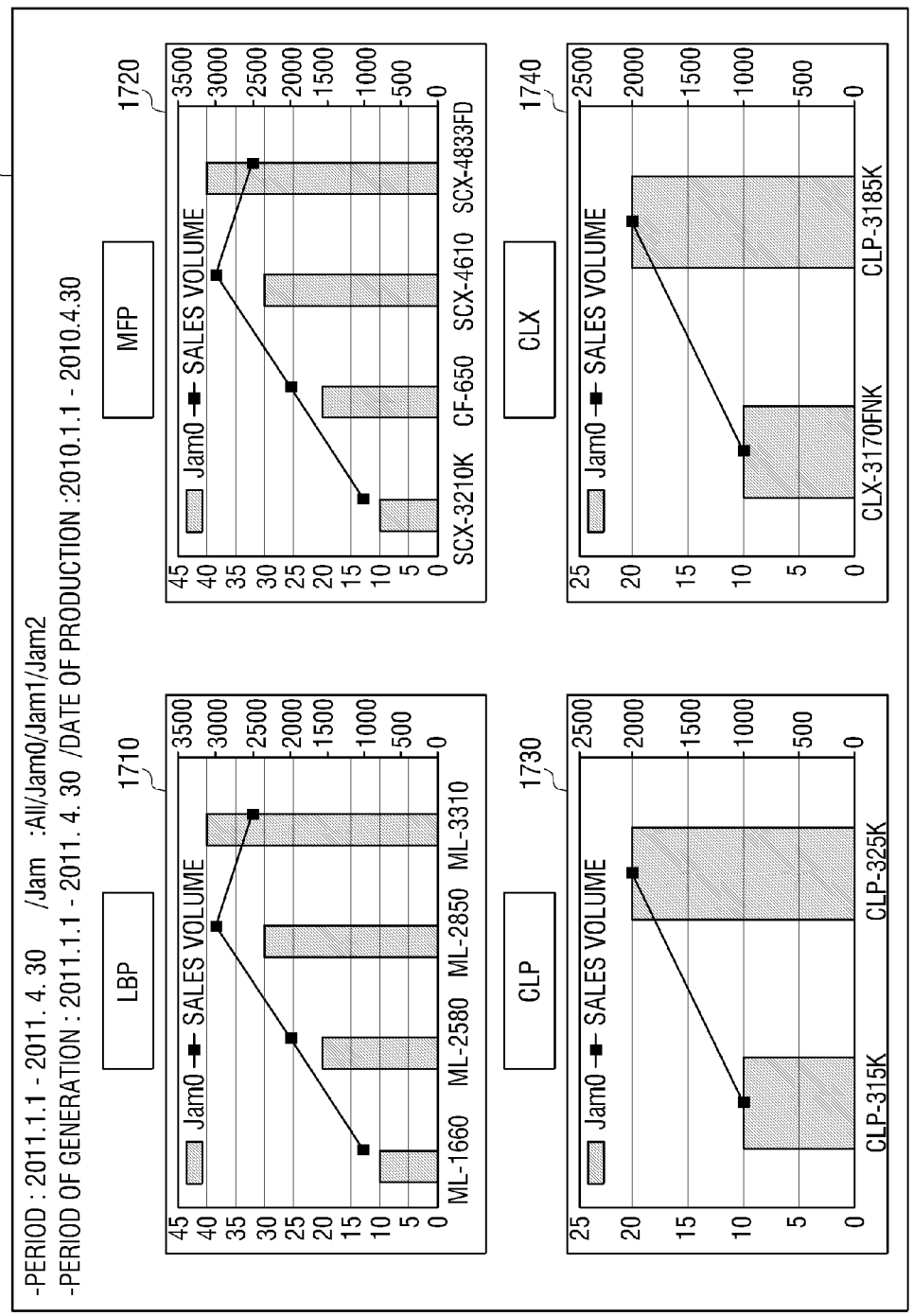

FIGS. 17 and 18 are views illustrating various examples of a user interface window which can be displayed in the management server 200 of FIG. 1.

Referring to FIG. 17, a user interface window 1700 displays a statistic value calculated by the statistics unit 250. The management server of FIG. 1 provides statistic information to a manager and thus, may improve a method of solving an error of an image forming apparatus. More specifically, the user interface window 1700 may include sections 1710, 1720, 1730, and 1740, each corresponding to a different type of image forming apparatus 10 and its particular sales volume statistics, based on model type.

Referring to FIG. 18, a manager may set and manage a video manual and errors easily using a user interface window 1800. More specifically, the manager may choose to select details 1820 of various items 1810, and provide remarks 1830 corresponding thereto.

FIG. 19 is a view illustrating an example of an error which may occur in relation to a scanning function.

A Multi-Function Peripheral (MFP) may have an error in its scanning function. Examples of an error with respect to a scanning function are illustrated in FIG. 19. In this case, the host device 100 may display a video manual corresponding to a scanning error in the same way as a printing error.

FIG. 20 is a flowchart to explain a method of solving an error of an image forming apparatus 10 in a host device 100 according to an exemplary embodiment of the present general inventive concept.

Referring to FIG. 20, first of all, status information is received from an image forming apparatus 10 at operation S2010. Status information may be requested periodically or upon a user's request and the status information may be received from the image forming apparatus 10 in accordance with the request. In this case, the status information status of the image forming apparatus 10 and may be an Extensible Mark-up Language (XML) file including a status element, a status message and a status code.

Whether the image forming apparatus 10 has an error or not is determined based on the received status information at operation S2020. Whether a connected image forming apparatus 10 has an error or in a warning status may be determined using a status code included in the received status information which is either an error or a warning code.

If an image forming apparatus 10 has an error, error information including status information is transmitted to the management server at operation S2030. Herein, the error information includes the model name of an image forming apparatus 10, the status information of an image forming apparatus 10, the firmware information of an image forming apparatus 10, the language supported by a host device 100, the resolution information of an image forming apparatus 10, and etc.

A URL address which provides a video manual to solve an error of an image forming apparatus 10 is received from a management server at operation S2040. The received URL address is accessed and thus, a video manual is received at operation S2050. Subsequently, the received video manual is displayed at operation S2060.

FIG. 21 is a flowchart illustrating the operation in FIG. 20.

Referring to FIG. 21, first of all, status information is received from an image forming apparatus at operation S2110. Whether the image forming apparatus has an error is not is determined according to the received status information at operation S2115.

If it is determined that the image forming apparatus 10 has an error, error information including the received status information is transmitted to the management server 200, and it is determined whether there is a video manual corresponding to the error in the management server 200 at operation S2120. It is determined that a video manual corresponding to the error exists if a URL address corresponding to the error is received from the management server 200, and it is determined that a video manual corresponding to the error does not exist if a URL address corresponding to the error is not received from the management server 200.

If it Is determined that a video manual corresponding to the error exists, a user interface window including a first area showing that the error of the image forming apparatus 10 can be resolved may be displayed at operation S2125.

On the other hand, if it is determined that a video manual corresponding to the error does not exist, it is determined that whether an electronic document manual is installed in the host device 100 at operation S2130, and if an electronic document manual is not installed, only a user interface window showing that the image forming apparatus 10 has an error may be displayed at operation S2135. A user interface window without the first area showing that the error of the image forming apparatus 10 can be resolved may be displayed.

Meanwhile, if an electronic document manual is installed, it is determined whether there is an area corresponding to an electronic document manual corresponding to the error at operation S2140. If it is determined that there is an area corresponding to an electronic document manual corresponding to the error, the corresponding area is displayed at operation S2145, and if it is determined that there is no area corresponding to an electronic document manual corresponding to the error, an initial page of an electronic document manual may be displayed at operation S2150.

As described above, in a method of solving an error of an image forming apparatus 10 in a host device 100 according to an exemplary embodiment, a user is provided with a video manual corresponding to the error of the image forming apparatus 10 and thus, the user may solve the error of the image forming apparatus 10 easily. In addition, as a video manual is received from outside and provided to a user, a method of installing a printer and a method of solving an error may be provided even in a mobile device (e.g., a mobile phone) in which an electronic document manual is not installed. The error solving method in FIGS. 20 and 21 may be performed not only in a host device 100 having the configuration in FIG. 2, but also in a host device 100 having other configurations.

Figure 22:
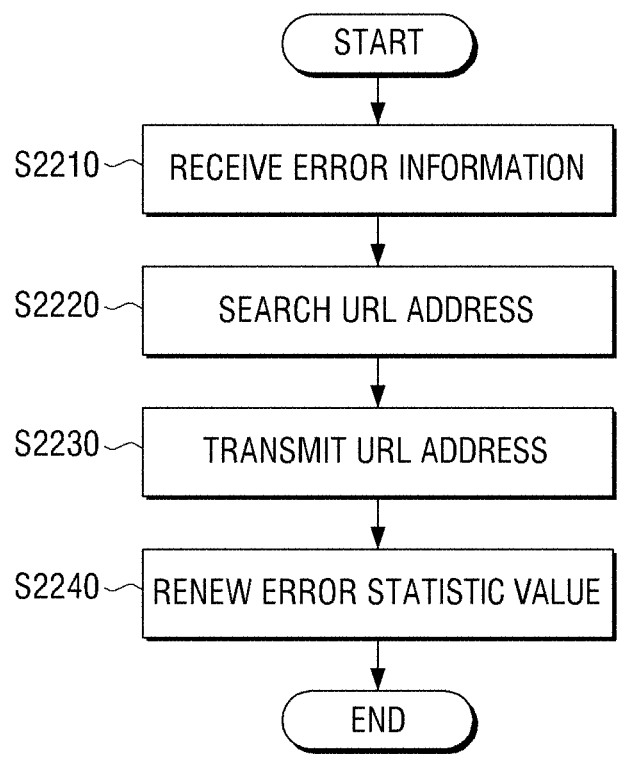
FIG. 22 is a flowchart illustrating a method of solving an error of an image forming apparatus in a management server according to an exemplary embodiment of the present general inventive concept.

FIG. 22 is a flowchart illustrating a method of solving an error of an image forming apparatus 10 in a management server 200 according to an exemplary embodiment of the present general inventive concept.

First of all, error information of an image forming apparatus 10 connected to the host device 100 is received from the host device 100 at operation S2210. Herein, the error information includes the model name of an image forming apparatus 10, the status information of an image forming apparatus 10, the firmware information of an image forming apparatus 10, the language supported by a host device 100, the resolution information of an image forming apparatus 10, and etc.

Subsequently, a URL address corresponding to the received error information is searched at operation S2220. A URL address providing a video manual corresponding to the received error information may be searched using pre-stored URL address information (which stores the type of image forming apparatuses, video manuals corresponding to each error and URL addresses of corresponding video manuals in the form of a look-up table).

The searched URL address is transmitted to the host device 100 at operation S2230 and the statistic value of the error information is calculated at operation S2240. The received error information is stored, and a statistic value of the number of errors corresponding to each image forming apparatus 10 and the number of errors corresponding to each error type may be calculated using the stored error information. The calculated statistic value may be displayed for a manager.

In a method of solving an error of an image forming apparatus in a management server 200 according to the present general inventive concept, a video manual corresponding to an error of the image forming apparatus 10 is provided to the host device 100 and thus, a user may solve the error of the image forming apparatus 10 easily. In addition, in case where a method of solving an error of the image forming apparatus 10 needs to be changed or a new method of solving an error needs to be added, a manager may change or add error solving methods easily.

In addition, as a video manual is received from outside and provided to a user, a method of installing a printer and a method of solving an error may be provided even in a mobile device (e.g., a mobile phone) in which an electronic document manual is not installed. The method of solving an error of an image forming apparatus in a management server in FIG. 22 may be performed not only in a management server having the configuration in FIG. 3 but also in a management device having other configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can generate or transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host device connectable to at least one image forming apparatus and an external management server, the host device comprising:
    a communication interface unit to receive status information from the image forming apparatus;
    a controller to control the communication interface unit to relay the status information to the external management server if it is determined that the image forming apparatus has an error according to the received status information, to receive a URL address of a manual for solving the error of the image forming apparatus from the external management server; and
    a user interface unit to display the manual corresponding to the received URL address,
    wherein the user interface unit displays a user interface window including a first area showing that a manual for solving the error of the image forming apparatus is available if the image forming apparatus has an error and a URL address of the manual is received from the management server.

2. The host device as claimed in claim 1, wherein the user interface unit displays that the image forming apparatus has an error if the image forming apparatus has an error.

3. The host device as claimed in claim 1, wherein the user interface unit displays the manual on a separate user interface window if a user selects the first area.

4. The host device as claimed in claim 1, wherein the user interface unit displays a subtitle corresponding to the manual on the manual.

5. The host device as claimed in claim 1, a storage unit to store an electronic document manual to solve an error of an image forming apparatus,
    wherein the controller controls the user interface unit to search an area of the electronic document manual corresponding to the error of the image forming apparatus and display an area of the searched electronic document manual if the image forming apparatus has an error and a URL of a manual for solving the error of the image forming apparatus is not received from the external management server.

6. The host device as claimed in claim 1, wherein the status information includes at least one of an element of status information, a status message explaining the status element, and a status code representing the status information.

7. The host device as claimed in claim 1, wherein the controller controls the communication interface to transmit at least one of a model name of the image forming apparatus, a status element of the image forming apparatus, firmware information of the image forming apparatus, a language supported by the host device, and resolution information of the image forming apparatus to the external management server.

8. The host device as claimed in claim 1, further comprising:
    a storage unit to temporarily store a manual provided by the URL address.

9. A management server connectable to at least one host device, the management server comprising:
    a storage unit to store URL address information providing a manual about an image forming apparatus;
    a communication interface unit to receive status information of an image forming apparatus connected to the host device from the host device; and a controller to search a URL address corresponding to the received status information using the pre-stored URL address information, the searched URL providing access to the manual to the host device based only on the host device receiving the searched URL from the management server, and to store the communication interface unit to transmit the searched URL address to the host device,
wherein the host device including a user interface unit to display a user interface window including a first area showing that a manual for solving an error of the image forming apparatus is available if the image forming apparatus has an error and a URL address of a manual for solving the error of the image forming apparatus is received from the management server.

10. The management server as claimed in claim 9, the status information comprising error information,
wherein the storage unit stores the received error information,
wherein the management server further comprises:
a statistics unit to calculate a statistic value of the stored error information; and
a user interface unit to display the calculated statistic value.

11. The management server as claimed in claim 9, wherein the storage unit stores a manual corresponding to each image forming apparatus and each status type,
wherein the communication interface unit provides the host device with a manual corresponding to the URL address.

12. The management server as claimed in claim 11, wherein the control unit changes resolution of the manual according to resolution of the host device and provides the host device with the changed resolution of the manual.

13. A method of solving an error of an image forming apparatus in a host device connected to at least one image forming apparatus and an external management server, the method comprising:
receiving status information from the image forming apparatus;
if the image forming apparatus has an error, relaying the status information to the external management server;
receiving a URL address of a manual for solving the error of the image forming apparatus from the external management server;
displaying the manual corresponding to the received URL address; and
if the image forming apparatus has an error and a URL address of a manual for solving the error of the image forming apparatus is received from the external management server, displaying a user interface window including a first area showing that the manual for solving the error of the image forming apparatus is available.

14. The method as claimed in claim 13, further comprising:
if the image forming apparatus has an error, displaying that the image forming apparatus has an error.

15. The method as claimed in claim 13, wherein the displaying comprises, if a user selects the first area, displaying the manual on a separate user interface window.

16. The method as claimed in claim 13, wherein the displaying comprises displaying a subtitle corresponding to the manual on the manual.

17. The method as claimed in claim 13, further comprising:
if the image forming apparatus has an error and a URL address of a manual for solving the error of the image forming apparatus is not received from the external management server, searching pre-stored an electronic document manual to solve an error of an image forming apparatus and displaying an area of the electronic document manual corresponding to the error of the image forming apparatus.

18. The method as claimed in claim 13, wherein the status information includes at least one of an element of status information, a status message explaining the status element, and a code representing the status information.

19. The method as claimed in claim 13, further comprising transmitting at least one of a model name of the image forming apparatus, a status element of the image forming apparatus, firmware information of the image forming apparatus, a language supported by the host device, and resolution information of the image forming apparatus to the external management server.

20. The method as claimed in claim 13, further comprising:
temporarily storing a manual provided by the URL address.

21. A method of solving an error of an image forming apparatus in a management server connectable to at least one host device, the method comprising:
receiving status information of an image forming apparatus connected to the host device from the host device;
searching a URL address corresponding to the received status information using pre-stored URL address information by the management server to provide the searched URL to the host device providing access to the manual based only on the searched URL to solve an error of an image forming apparatus;
transmitting the searched URL address to the host device; and
if the image forming apparatus has an error and a URL address of a manual for solving the error is received from the external management server, the host device displaying a user interface window including a first area showing that a manual for solving the error of the image forming apparatus is available.

22. The method as claimed in claim 21, further comprising:
storing the received status information;
calculating a statistic value of the stored status information; and
displaying the calculated statistic value.

23. The method as claimed in claim 21, wherein the management server has a plurality of URL addresses providing the manual,
wherein the method of solving an error of an image forming apparatus further comprises:
if a host device is connected to the URL address, providing a manual corresponding to the URL address to the host device.

24. The method as claimed in claim 23, wherein the providing comprises changing resolution of the manual according to resolution of the host device and providing the changed resolution of the manual to the host device.

25. A non-transitory computer readable medium including a program to execute a method of solving an error of an image forming apparatus, wherein the method comprises:
receiving status information from the image forming apparatus;
if the image forming apparatus has an error, relaying the status information to an external management server;
receiving a URL address of a manual for solving the error of the image forming apparatus from the external management server;
displaying the manual corresponding to the received URL address; and if the image forming apparatus has an error and a URL address of a manual for solving the error is received from the external management server, displaying a user interface window including a first area showing that a manual for solving the error of the image forming apparatus is available.

* * * * *